United States Patent
Fauser

(10) Patent No.: US 7,484,764 B2
(45) Date of Patent: Feb. 3, 2009

(54) FRAME FOR A SAFETY BELT RETRACTOR

(75) Inventor: Erwin Fauser, Schwaebisch Gmuend (DE)

(73) Assignee: TRW Automotive GmbH, Alfdorf (DE)

( * ) Notice: Subject to any disclaimer, the term of this patent is extended or adjusted under 35 U.S.C. 154(b) by 102 days.

(21) Appl. No.: 11/602,843

(22) Filed: Nov. 22, 2006

(65) Prior Publication Data

US 2007/0114317 A1    May 24, 2007

(30) Foreign Application Priority Data

Nov. 22, 2005   (DE)  .................. 10 2005 055 681

(51) Int. Cl.
*B60R 22/34*     (2006.01)
*B60R 22/195*    (2006.01)

(52) U.S. Cl. .............................. 280/807

(58) Field of Classification Search ............. 280/807, 280/801.1, 806; 242/379.1; 297/474, 475, 297/476, 477, 478, 479
See application file for complete search history.

(56) References Cited

U.S. PATENT DOCUMENTS

| | | | |
|---|---|---|---|
| 3,287,063 A | 11/1966 | Nicholas | |
| 4,303,209 A | 12/1981 | Stephenson | |
| 5,211,694 A | 5/1993 | Sakakida et al. | |
| 5,740,979 A * | 4/1998 | Rohrle | 242/382 |
| 6,068,297 A | 5/2000 | Weller | |
| 6,837,520 B2 * | 1/2005 | Singer | 280/807 |
| 7,128,374 B2 * | 10/2006 | Mitropoulos | 297/472 |
| 7,220,291 B2 * | 5/2007 | Morse et al. | 55/502 |
| 2003/0137141 A1 | 7/2003 | Singer | |
| 2006/0108785 A1 * | 5/2006 | Ehlers et al. | 280/801.1 |

FOREIGN PATENT DOCUMENTS

| | | |
|---|---|---|
| DE | 28 22 210 | 11/1979 |
| DE | 2822210 | 11/1979 |
| DE | 19510603 | 9/1996 |
| DE | 297 01 841 U1 | 7/1997 |
| DE | 29701841 | 7/1997 |
| DE | 197 12 358 C1 | 7/1998 |
| DE | 19712358 | 7/1998 |
| DE | 100 19 276 C1 | 10/2001 |
| DE | 10019276 | 10/2001 |
| DE | 101 26 171 C1 | 5/2002 |
| DE | 10126171 | 5/2002 |
| DE | 20219689 | 5/2003 |
| DE | 102 39 740 A1 | 3/2004 |
| DE | 10239740 | 3/2004 |
| EP | 1419943 | 5/2004 |
| GB | 2020963 | 11/1979 |
| WO | 2004/048160 | 6/2004 |
| WO | WO 2004/048160 | 6/2004 |

* cited by examiner

*Primary Examiner*—John Q. Nguyen
*Assistant Examiner*—Joseph Rocca
(74) *Attorney, Agent, or Firm*—Tarolli, Sundheim, Covell & Tummino LLP

(57) ABSTRACT

A frame for a safety belt retractor includes a rear wall (12) and a fastening section which provides for at least one of fastening the frame (10) to a section (22) of a component which is fixed to a vehicle and pre-positioning the frame (10) on the section (22), the fastening section being formed integrally with the rear wall (12).

12 Claims, 4 Drawing Sheets

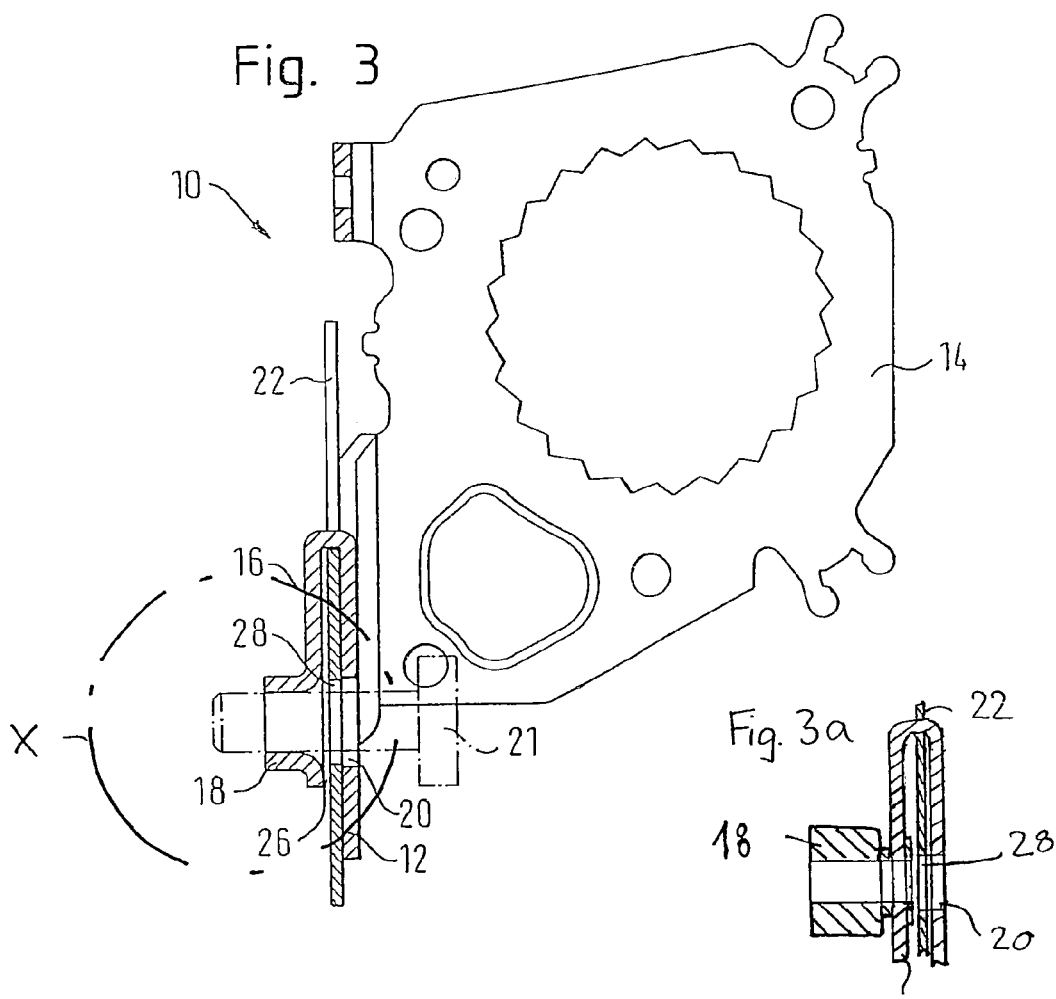
Fig. 3
Fig. 3a
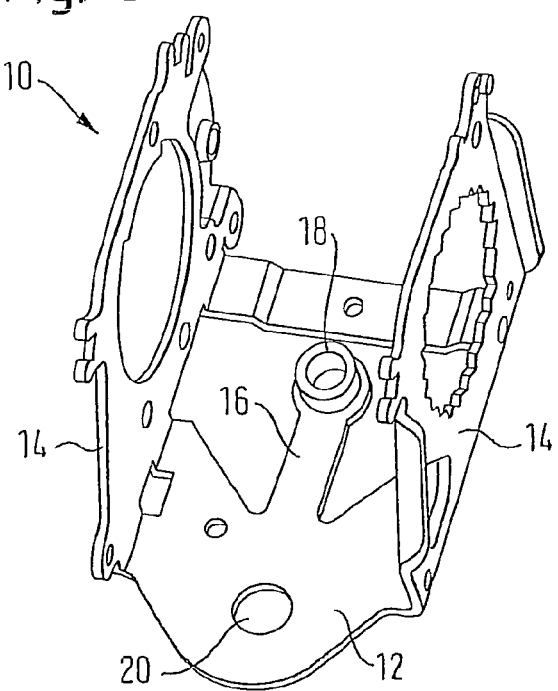
Fig. 5

FRAME FOR A SAFETY BELT RETRACTOR

TECHNICAL FIELD

The invention relates to a frame for a safety belt retractor.

BACKGROUND OF THE INVENTION

A frame of a safety belt retractor may be fastened in various ways to a section of a component which is fixed to the vehicle.

Frames are known from the prior art onto which a bent fitting which has a press nut is riveted or welded. The fitting is placed onto the vehicle body and is fixed thereon by a fastening means. The fitting is riveted or welded onto the frame in a separate operating step. The production of the frame is therefore expensive.

Press nuts may also be riveted or welded onto the vehicle body itself, which involves a large amount of effort. The frame of the safety belt retractor then has an opening through which the fastening means is screwed into the press nut.

The object of the invention consists in producing a frame for a safety belt retractor, which can be mounted simply to a vehicle body.

BRIEF SUMMARY OF THE INVENTION

This is achieved in a frame for a safety belt retractor including a rear wall and a fastening section which provides for at least one of fastening the frame to a section of a component which is fixed to a vehicle and pre-positioning the frame on the section, the fastening section being formed integrally with the rear wall. The frame itself therefore has the fastening section and not—as was known from the prior art—a separate part. Therefore, a separate part does not have to be fastened to the frame, i.e. welded or riveted, whereby the costs for producing the frame are reduced. The fastening section may be arranged such that it can be put in place on the section of the component which is fixed to the vehicle, whereby the frame is pre-positioned. The frame may then be secured simply and quickly by a fastening means to the component which is fixed to the vehicle.

The fastening section is preferably a tongue, the tongue being a bent part of the rear wall. The angle between the rear wall and the tongue may be as desired.

In particular, the tongue is bent through 180 degrees with respect to the rear wall. The bent tongue may then be placed onto a recess on the section of the component which is fixed to the vehicle, whereby the frame is pre-positioned.

A receiving space is preferably formed between the tongue and the rear wall, the receiving space being able to receive the section of the component which is fixed to the vehicle, whereby the frame is pre-positioned on the component which is fixed to the vehicle. When the frame is arranged on the vehicle body, the receiving space is placed onto the section of the component which is fixed to the vehicle, so that the frame is pre-positioned. The fastening means is then screwed in, whereby the frame is fixed to the vehicle body.

According to one embodiment, the tongue is formed by punching the rear wall and subsequent bending. The tongue is produced integrally with the frame, the frame consisting of the rear wall and two side walls. After the sheet metal piece has been punched out, the tongue is bent around. The side walls are angled here through 90 degrees with respect to the rear wall, either before or after the tongue has been bent.

Preferably, a thread portion is provided on the frame, the thread portion being able to receive, for example, a screw.

The thread portion may be provided on the fastening section, the thread portion being in alignment with an opening in the rear wall, or the thread portion may be provided on the rear wall, the thread portion being in alignment with an opening in the fastening section. The fastening means which is, for example, a screw, is screwed into the thread portion, which is provided on the fastening section and/or on the rear wall, after the arranging of the frame on the section of the component which is fixed to the vehicle, through the opening in the rear wall and/or in the fastening section and a bore in the section of the component which is fixed to the vehicle. The bore here is likewise in alignment with the opening and the thread portion. The fastening of the frame to the section of the component which is fixed to the vehicle can therefore take place from the interior of the vehicle or from the side of the section of the component which is fixed to the vehicle which is faced away from the safety belt retractor.

For example, the thread portion is a separate part, the thread portion being attached to the fastening section or to the rear wall. Thus, the thread portion is attached to the fastening section or to the rear wall after punching the rear wall and the side walls. The thread section can also be formed integrally with the fastening section or the rear wall, whereby an attaching afterwards is eliminated.

BRIEF DESCRIPTION OF THE DRAWINGS

FIG. 3 shows a sectional view of the frame along the line III-III in FIG. 2 having a thread portion which is integrally formed with the frame, FIG. 3a shows an enlarged view of the section in FIG. 3 which is referenced with X having a separate thread portion, FIG. 5 shows a perspective view of the frame with angled side walls and with the tongue not bent.

BRIEF DESCRIPTION OF THE PREFERRED EMBODIMENTS

Figure 1:
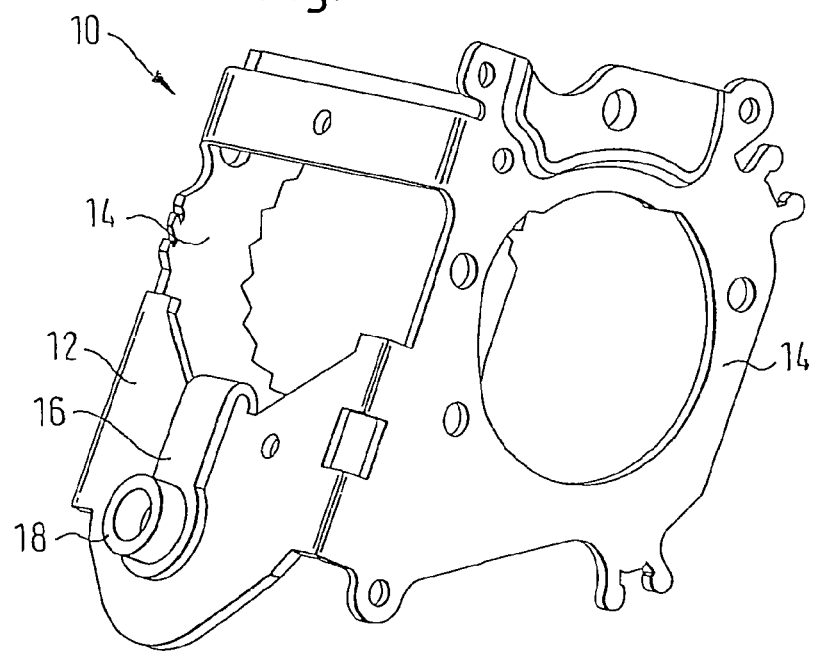
FIG. 1 shows a perspective view of a frame according to the invention according to a first embodiment for a safety belt retractor.
Figure 2:
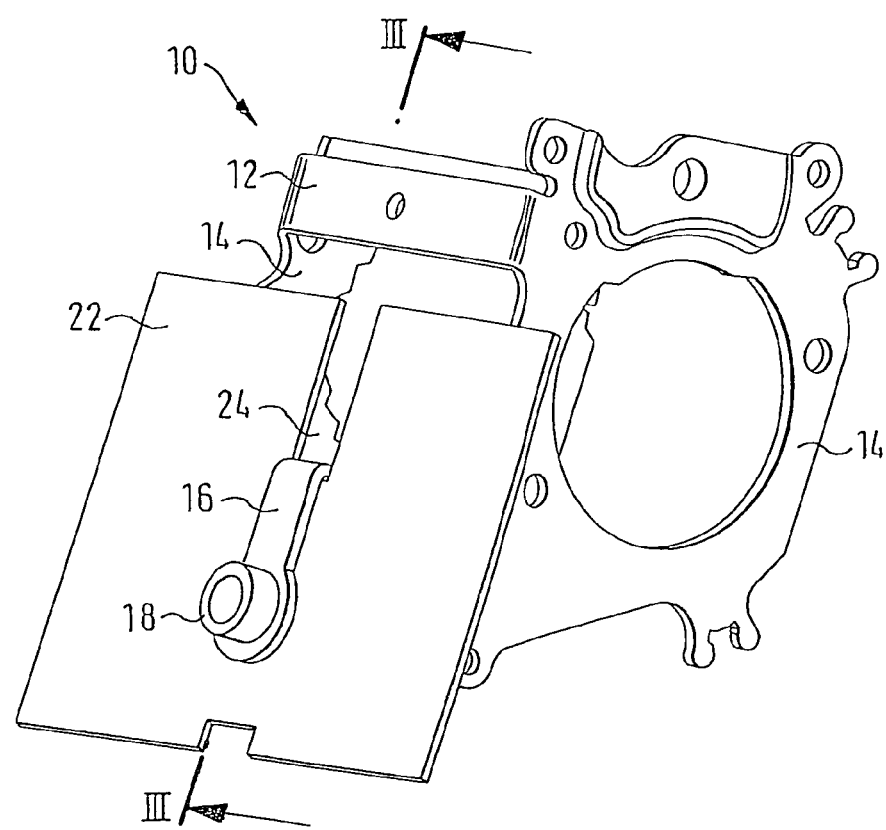
FIG. 2 shows a perspective view of the frame with a section of a component which is fixed to the vehicle.

In the figures, a frame 10 for a safety belt retractor is shown. The frame 10 has a rear wall 12 and two side walls 14 at right angles thereto.

In the following the first embodiment is described, the first embodiment being shown in FIGS. 1 to 5.

A fastening section is formed integrally with the rear wall 12, the fastening section is designed as a tongue 16. The tongue 16 has at its end a thread portion 18 which is part of the tongue 16 (FIG. 3).

As is shown particularly in FIG. 3, the tongue 16 is bent through 180 degrees with respect to the rear wall 12, i.e. the angle between the rear wall 12 and the tongue 16 is 180 degrees.

The rear wall 12 has an opening 20 through which a screw 21 can be guided, which is then screwed into the thread portion 18 which is in alignment with the opening 20.

The arranging of the frame 10 on a section 22 of a component which is fixed to the vehicle (see FIGS. 2 and 3) takes place as follows:

The frame 10 with the bent tongue 16 is placed onto a recess 24 in the section 22 of the component which is fixed to the vehicle. A receiving space 26, which is formed between the rear wall 12 and the bent tongue 16, then receives the section 22 of the component which is fixed to the vehicle, and the frame 10 is pre-positioned on the section 22.

A bore 28 (FIG. 3) in the section 22 of the component which is fixed to the vehicle is in alignment with the thread portion 18 after the pre-positioning of the frame 10, and with the opening 20 in the rear wall 12. A fitter can then screw the screw 21 into the thread portion 18 from the interior of the vehicle through the opening 20 of the rear wall 12 and the bore 28 in the part which is fixed to the vehicle, whereby the frame 10 is secured.

Instead of the embodiment which is shown in FIG. 3 and in which the thread portion 18 is part of the tongue 16, the thread portion 18 could be a separate part which is attached to the tongue 16 (FIG. 3a). Then, the thread portion 18 is part of a press nut, a rivet nut, a weld nut or a knurled nut The production of the frame 10 is described in two embodiments with the aid of FIGS. 4a, 4b and 5:

The outlines of the rear wall 12 and the side walls 14 are punched out mechanically from a flat sheet metal piece having a large area. In doing this, openings for rivets, for the mounting of a belt spool and teeth which are necessary for locking the belt spool, are punched out inter alia, and a thread portion 18 is formed on the tongue 16, e.g. by pressing in a nut, welding on a nut etc.

Figure 4B:
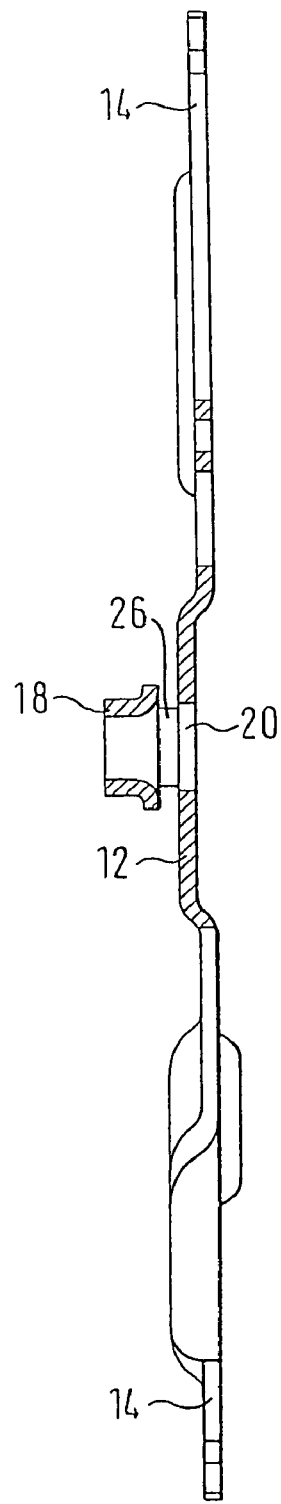
FIG. 4b shows a sectional view of the frame with the bent tongue and with non-angled side walls.
Figure 4A:
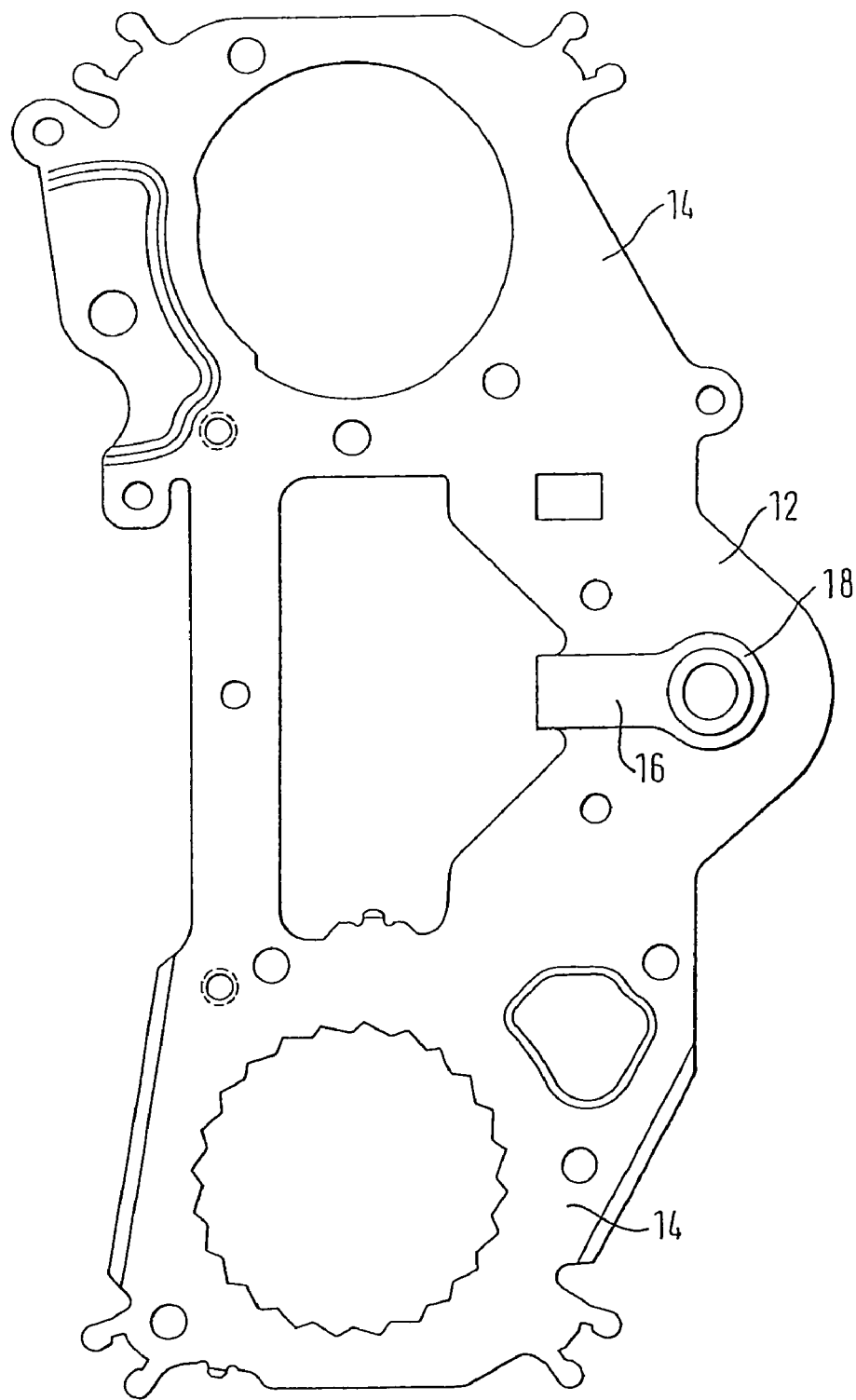
FIG. 4a shows a top view of the frame with the bent tongue and with non-angled side walls.

In the embodiment according to FIGS. 4a and 4b, the tongue 16 is then bent with the thread portion 18 through 180 degrees with respect to the rear wall 12. In the state in which the rear wall 12 and the side walls 14 are flat, the punched parts can be transported to another processing site at which the side walls 14 are each angled through 90 degrees to the rear wall 12. After the installation of a belt spool, a locking mechanism, a force-limiter system etc., the assembled safety belt retractor can be fastened by means of the frame 10 to the section 22 of the component which is fixed to the vehicle.

FIG. 5 shows a further possibility for producing the frame 10. Here, after the rear wall 12 and the side walls 14 have been punched out and if applicable the thread portion 18 has been arranged, firstly the side walls 14 are angled and then the tongue 16 is bent through 180 degrees.

Figure 6:
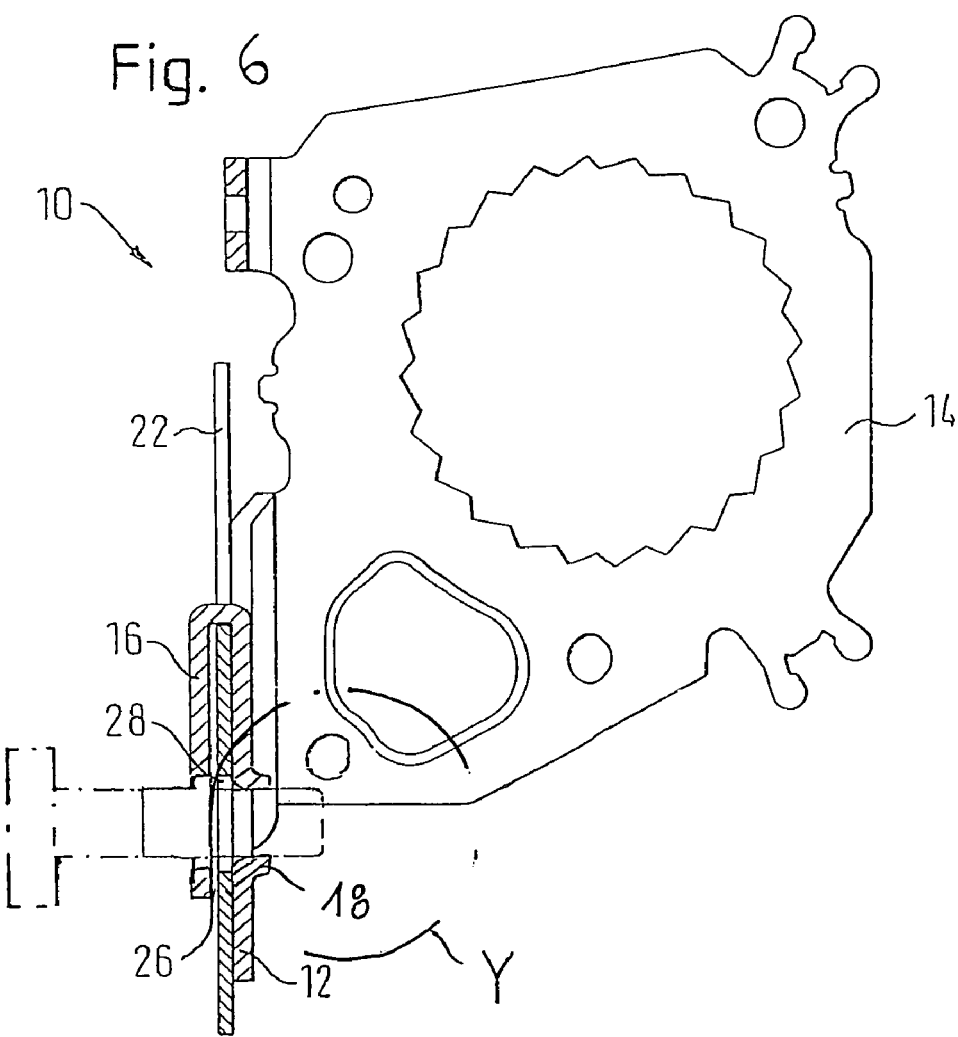
FIG. 6 shows a side view of a frame according to the invention according to a second embodiment for a safety belt retractor having a thread portion which is integrally formed with the frame.
Figure 6A:
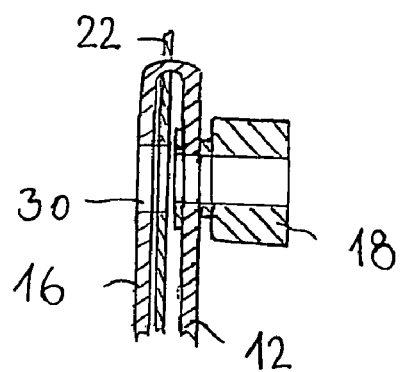
FIG. 6a shows an enlarged view of the section in FIG. 6 which is referenced with Y having a separate thread portion

FIG. 6 shows a second embodiment of the frame 10 for a safety belt retractor. This embodiment only differs from the embodiment which is shown in FIGS. 1 to 5 that the fastening section, which is designed as a tongue 16, has an opening 30 instead of a thread portion 18. In this embodiment, the thread portion 18 is part of the rear wall 12.

When the frame 10 is arranged on the vehicle body, the tongue 16 is placed onto the recess 24 in the section 22 of the component which is fixed to the vehicle. After the pre-positioning the thread portion 18 in the rear wall 12 is in alignment with the bore 28 in the section 22 of the component which is fixed to the vehicle and the opening 30 in the tongue 16. A fitter can then screw the screw 21 into the thread portion 18 from the side which is facing away from the frame 10 through the opening 30 of the tongue 16 and the bore 28 in the part which is fixed to the vehicle, whereby the frame 10 is secured.

The thread portion 18 can also be attached as a separate part on the rear wall 12 and can be part of a press nut, a rivet nut, a weld nut or a knurled nut.

The invention claimed is:

1. A frame for a safety belt retractor, comprising:
   a rear wall (12);
   a fastening section which provides for fastening said frame (10) to a section (22) of a component which is fixed to a vehicle and pre-positioning said frame (10) on said section (22), said fastening section being a tongue (16) formed integrally with said rear wall (12) and being a bent part of said rear wall (12);
   a receiving space (26) formed between said tongue (16) and said rear wall (12), said receiving space (26) being able to receive said section (22) of said component which is fixed to said vehicle, whereby said frame (10) is pre-positioned on said component which is fixed to said vehicle; and
   a thread portion (18) provided on said fastening section of said frame (10), said thread portion (18) being in alignment with an opening (20) in said rear wall (12).

2. The frame according to claim 1, wherein said tongue (16) is bent through 180 degrees with respect to said rear wall (12).

3. The frame according to claim 1, wherein said tongue (16) is formed by punching said rear wall (12) and by subsequent bending.

4. The frame according to claim 1, wherein said thread portion (18) is a separate part, said thread portion (18) being attached to said fastening section.

5. The frame according to claim 4, wherein said thread portion (18) is part of a press nut.

6. The frame according to claim 4, wherein said thread portion (18) is part of a rivet nut.

7. The frame according to claim 4, wherein said thread portion (18) is part of a weld nut.

8. The frame according to claim 4, wherein said thread portion (18) is part of a knurled nut.

9. The frame according to claim 1, wherein said thread portion (18) is a separate part, said thread portion (18) being attached to said rear wall (12).

10. The frame according to claim 1, wherein said thread portion (18) is formed integrally with said fastening section.

11. The frame according to claim 1, wherein said thread portion (18) is formed integrally with said rear wall (12).

12. A frame for a safety belt retractor, comprising:
    a rear wall (12);
    a fastening section which provides for fastening said frame (10) to a section (22) of a component which is fixed to a vehicle and pre-positioning said frame (10) on said section (22), said fastening section being a tongue (16) formed integrally with said rear wall (12) and being a bent part of said rear wall (12);
    a receiving space (26) formed between said tongue (16) and said rear wall (12), said receiving space (26) being able to receive said section (22) of said component which is fixed to said vehicle, whereby said frame (10) is pre-positioned on said component which is fixed to said vehicle; and
    a thread portion (18) provided on said rear wall (12) of said frame (10), said thread portion (18) being in alignment with an opening (30) in said fastening section.

* * * * *